(12) United States Patent
Ozer

(10) Patent No.: US 9,399,713 B1
(45) Date of Patent: Jul. 26, 2016

(54) ASPHALT RECOVERY SYSTEM AND PROCESS

(71) Applicant: Crown Iron Works Company, Roseville, MN (US)

(72) Inventor: Richard W. Ozer, Golden Valley, MN (US)

(73) Assignee: CROWN IRON WORKS COMPANY, Roseville, MN (US)

( * ) Notice: Subject to any disclaimer, the term of this patent is extended or adjusted under 35 U.S.C. 154(b) by 551 days.

(21) Appl. No.: 13/651,215

(22) Filed: Oct. 12, 2012

Related U.S. Application Data

(60) Provisional application No. 61/546,455, filed on Oct. 12, 2011.

(51) Int. Cl.
*C10G 1/10* (2006.01)
*C08L 95/00* (2006.01)

(52) U.S. Cl.
CPC .................................... *C08L 95/00* (2013.01)

(58) Field of Classification Search
CPC ..................................................... C08L 95/00
See application file for complete search history.

(56) References Cited

U.S. PATENT DOCUMENTS

| | | |
|---|---|---|
| 1,762,785 A | 6/1930 | Little |
| 2,368,371 A | 1/1945 | Guy |
| 4,017,383 A | 4/1977 | Beavon |
| 4,101,415 A | 7/1978 | Crowley |
| 4,211,633 A | 7/1980 | Gleim |
| 4,222,851 A * | 9/1980 | Good et al. ...................... 208/45 |
| 4,239,616 A | 12/1980 | Gearhart |
| 4,250,023 A | 2/1981 | Samis et al. |
| 4,269,693 A | 5/1981 | Hastie |
| 4,273,644 A | 6/1981 | Harris et al. |
| 4,279,739 A | 7/1981 | Roach |
| 4,313,011 A | 1/1982 | Weil |
| 4,324,651 A | 4/1982 | Rollmann et al. |
| 4,325,641 A | 4/1982 | Babus et al. |
| 4,364,745 A | 12/1982 | Weil |
| 4,421,639 A | 12/1983 | Lambert et al. |
| 4,592,831 A | 6/1986 | Rhoe et al. |
| 4,706,893 A | 11/1987 | Brock |
| 4,726,846 A | 2/1988 | Jackson |
| 4,755,278 A | 7/1988 | Baumgartner |

(Continued)

FOREIGN PATENT DOCUMENTS

EP 612725 7/1996

*Primary Examiner* — Randy Boyer
*Assistant Examiner* — Juan Valencia
(74) *Attorney, Agent, or Firm* — Fredrikson & Byron, P.A.

(57) ABSTRACT

An asphalt recovery system may include an extractor, a desolventizer, and an evaporator. During operation, the extractor may receive a solvent and roofing waste and extract asphalt from the roofing waste with the solvent. The desolventizer may receive a solvent-wet solids stream from the extractor and vaporize solvent from the solvent-wet solids stream to yield desolventized solids. The evaporator may receive an asphalt-rich solvent stream from the extractor and vaporize solvent from the stream to produce a solvent stream and an asphalt stream. By configuring the evaporator to operate at a pressure above atmospheric pressure, the boiling point in the evaporator may increase as compared to operating the evaporator at a pressure below atmospheric pressure. In turn, this may keep the viscosity of asphalt within the evaporator less than 500 centipoise, which may improve heat transfer to the asphalt and prevent that asphalt from plugging the evaporator.

9 Claims, 6 Drawing Sheets

(56) References Cited

U.S. PATENT DOCUMENTS

| | | |
|---|---|---|
| 4,795,551 A | 1/1989 | Hamilton et al. |
| 4,802,139 A | 1/1989 | Sasaki |
| 4,885,079 A | 12/1989 | Eppig |
| 4,981,579 A | 1/1991 | Paspek |
| 5,009,772 A | 4/1991 | Nelson et al. |
| 5,053,118 A | 10/1991 | Houser |
| 5,092,983 A | 3/1992 | Eppig |
| 5,098,025 A | 3/1992 | Drouin et al. |
| 5,145,617 A | 9/1992 | Hermanson |
| 5,164,002 A | 11/1992 | Ballenger, Jr. |
| 5,201,472 A | 4/1993 | Brock |
| 5,242,580 A | 9/1993 | Sury |
| 5,304,576 A | 4/1994 | Martinez |
| 5,337,965 A | 8/1994 | Chiovitti |
| 5,338,368 A | 8/1994 | Fletcher |
| 5,362,316 A | 11/1994 | Paradise |
| 5,378,079 A | 1/1995 | Omann |
| 5,378,369 A | 1/1995 | Rose et al. |
| 5,385,426 A | 1/1995 | Omann |
| 5,386,947 A | 2/1995 | Omann |
| 5,440,055 A | 8/1995 | Castor |
| 5,451,003 A | 9/1995 | Omann |
| 5,476,986 A | 12/1995 | Jacobsen |
| 5,720,825 A | 2/1998 | Kinnaird |
| 5,750,709 A | 5/1998 | Castor |
| 5,811,607 A | 9/1998 | Richardt et al. |
| 5,987,776 A * | 11/1999 | Holcombe et al. ............. 34/330 |
| 6,588,973 B1 | 7/2003 | Omann |
| 7,264,711 B2 | 9/2007 | Zwick |
| 7,566,394 B2 | 7/2009 | Koseoglu |
| 7,854,836 B2 | 12/2010 | Chirinos et al. |
| 7,857,904 B2 * | 12/2010 | Trumbore et al. ......... 106/273.1 |
| 7,927,465 B2 | 4/2011 | Novak |
| 7,981,277 B2 | 7/2011 | Subramanian et al. |
| 2010/0329935 A1 * | 12/2010 | McGehee et al. ............. 422/140 |
| 2011/0048916 A1 | 3/2011 | Novak |

* cited by examiner

ASPHALT RECOVERY SYSTEM AND PROCESS

This disclosure claims priority to U.S. Provisional Patent Application No. 61/546,455, filed Oct. 12, 2011, the entire contents of which are incorporated herein by reference.

TECHNICAL FIELD

This disclosure relates to systems and processes for recovering asphalt and, more particularly, to systems and processes for recovering asphalt from asphalt containing composite materials, such as roof shingles.

BACKGROUND

In general, asphalt shingles and roofing waste comprises asphalt and filler material, e.g., surface granules, reinforcing fiber or fiberglass, and other filler materials. Typically, asphalt makes up about 35% of shingles and roofing wastes. Asphalt is derived from crude oil. As rapidly as the price of crude oil has risen, the price of asphalt has recently risen even more rapidly. In addition to the costs associated with the use of crude oil in the asphalt manufacturing process, the process of manufacturing asphalt shingles also requires considerable amounts of fossil fuels to heat both the asphalt and the fillers combined in the manufacturing process.

Considerable waste is involved with the manufacture and use of asphalt roofing materials, such as shingles and roll roofing membranes. Significant amounts of roofing waste may end up in landfills. With efficient asphalt recovery systems and processes, roofing waste represents a valuable source of recoverable asphalt.

SUMMARY

In general, this disclosure is directed to systems and techniques for recovering asphalt from asphalt-containing waste materials. In some examples, a system includes an extractor, a desolventizer, and an evaporator. During operation, the extractor may receive solvent and asphalt-containing waste materials and extract asphalt from the waste materials with the solvent. The desolventizer may receive a solvent-wet solids stream from the extractor and vaporize solvent from the solvent-wet solids stream to yield desolventized solids. The evaporator may receive an asphalt-rich solvent stream from the extractor and vaporize solvent from the stream to produce a solvent stream and an asphalt stream. By configuring the evaporator to operate at a pressure above atmospheric pressure, the boiling point of solvent in the evaporator may increase as compared to operating the evaporator at a pressure below atmospheric pressure. In turn, this may keep the viscosity of asphalt within the evaporator less than 500 centipoise (e.g., less than 300 centipoise or less than 200 centipoise), which may improve heat transfer to the asphalt and/or prevent that asphalt from plugging the evaporator.

In one example, an asphalt recovery process is described that includes extracting asphalt from roofing waste with a solvent in an extractor to form an asphalt-rich solvent stream and solvent-wet solids stream. The example process further includes processing the solvent-wet solids in a desolventizer to vaporize solvent from the solvent-wet solids stream and yield desolventized solids. In addition, the example process includes vaporizing solvent from the asphalt-rich solvent stream in an evaporator. According to the example, the evaporator is operated at a pressure above atmospheric pressure so to increase a boiling point of the solvent as compared to operating at a pressure below atmospheric pressure and so that a viscosity of asphalt within the evaporator is less than 500 centipoise.

In another example, an asphalt recovery system is described that includes an extractor, a desolventizer, and an evaporator. The extractor is configured to receive a solvent and asphalt-containing waste material and extract asphalt from the asphalt-containing waste material with the solvent so as to form an asphalt-rich solvent stream and solvent-wet solids stream. The desolventizer is configured to receive the solvent-wet solids stream from the extractor and vaporize solvent from the solvent-wet solids stream to yield desolventized solids. The evaporator is configured to receive the asphalt-rich solvent stream from the extractor and vaporize solvent from the asphalt-rich solvent stream. According to the example, the evaporator is configured to operate at a pressure above atmospheric pressure so to increase a boiling point of the solvent in the evaporator as compared to operating at a pressure below atmospheric pressure and so that a viscosity of asphalt within the evaporator is less than 500 centipoise.

The details of one or more examples are set forth in the accompanying drawings and the description below. Other features, objects, and advantages will be apparent from the description and drawings, and from the claims.

DETAILED DESCRIPTION

Figure 1:
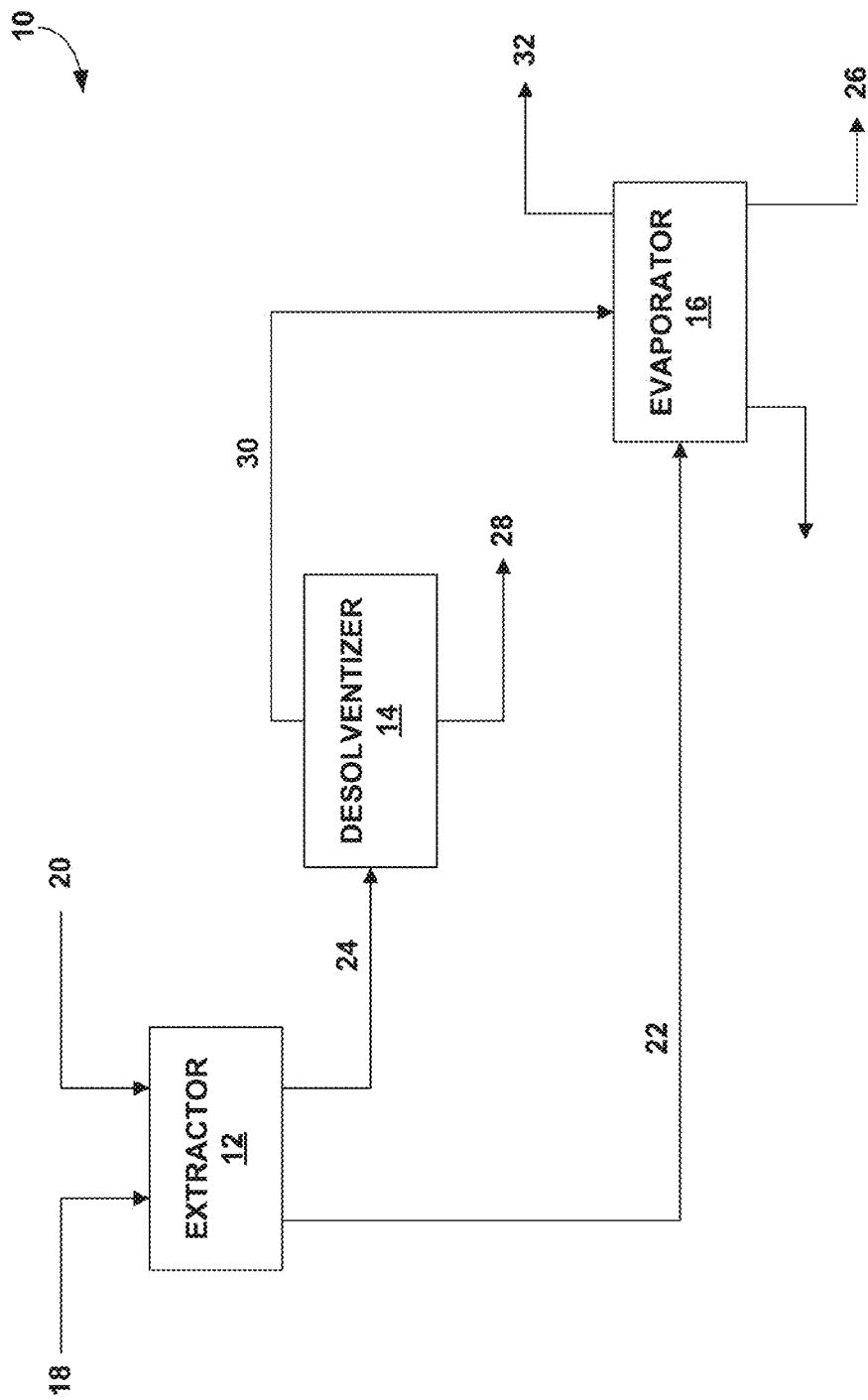
FIG. 1 is a block diagram illustrating an example process for recovering an asphalt component from an asphalt-containing material.

The following detailed description is exemplary in nature and is not intended to limit the scope, applicability, or configuration of the invention. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Asphalt-containing materials have found wide spread acceptance in the commercial and residential construction industries. For example, asphalt-containing roofing materials are among the most frequently used types of roofing materials. Asphalt-containing roofing materials typically include an asphalt body attached to or embedded with a fiber material. In some examples, an aggregate material such as a crushed mineral rock is also adhered to the asphalt body. Depending on the configuration of the asphalt-containing roofing material, the material may be in the form of an asphalt shingle, an asphalt roll roofing, an asphalt strip shingle, a felt saturated with asphalt, or the like.

At present, waste asphalt-containing roofing material is typically disposed of as landfill. This waste material may include unused new asphalt-containing roofing material such as, e.g., unused new asphalt roofing shingles or cutout tabs removed from new shingles during installation. This waste material may also include old shingles and associated material that are stripped off existing buildings and discarded before installing new roofing material. In instances in which waste asphalt-containing roofing material is disposed of as landfill, the asphalt within the material cannot be recovered for productive reuse or resale.

In accordance with systems and techniques described in some examples of the present disclosure, an asphalt-containing material may be processed to extract and recover an asphalt component from the asphalt-containing material. For example, an asphalt-containing composite roofing material that includes solidified asphalt and filler material may be processed to separate the asphalt from the filler material. In some examples, the asphalt material may be recovered from the asphalt-containing composite roofing material using a solvent-based recovery system. The system may be configured to contact the asphalt-containing composite roofing material with a solvent in an extractor so as to extract the asphalt component from the other components of the asphalt-containing composite roofing material. From the extractor, the system may produce an asphalt-rich solvent stream and an asphalt-reduced solids stream, thereby separating the asphalt component from the other components in the asphalt-containing material.

Depending on the configuration of the system, the asphalt-rich solvent stream may be processed to increase the concentration of the asphalt in the solvent stream. For example, the asphalt-rich solvent stream may be passed through an evaporator to vaporize a portion of the solvent in the asphalt-rich solvent stream, thereby increasing the concentration of the asphalt component in the asphalt-rich solvent stream. In addition, in some applications, the asphalt-reduced solids stream may be processed to help remove excess solvent from the solids stream. For example, the asphalt-reduced solids stream may be passed through a desolventizer to vaporize at least a portion of the solvent from the asphalt-reduced solids stream. In this way, the system may process an asphalt-containing material to produce a concentrated, asphalt-rich stream and a dried asphalt-reduced solids stream.

As described herein, in examples in which an asphalt recovery system includes an evaporator configured to increase the concentration of an asphalt component in an asphalt-rich solvent stream, the evaporator may be operated at a positive pressure. In one example, the asphalt-rich solvent stream enters the evaporator at or above ambient pressure and the evaporator produces a vapor stream at a pressure above ambient pressure and also a concentrated asphalt-rich solvent stream at a pressure above ambient pressure.

In contrast to an asphalt recovery system that includes an evaporator configured to operate at a pressure below ambient pressure, an asphalt recovery system as described in some examples of the present disclosure may heat an asphalt-rich solvent stream to a comparatively higher temperature to increase the boiling temperature of the solvent/asphalt mixture in the asphalt-rich solvent stream. This higher temperature may be used because the boiling point of the solvent in the asphalt-rich solvent stream may increase as the pressure of the stream increases. While operation at comparatively higher temperatures may consume additional energy during operation of the asphalt recovery system, the higher temperatures may help reduce the viscosity of the asphalt-rich solvent stream so it remains sufficiently flowable and less viscous, e.g., throughout the entire evaporator. This may help prevent plugging or other operational problems associated with operation of an asphalt recovery system.

Evaporators in asphalt recovery systems are typically operated at a negative pressure to keep the temperature in the evaporators low to maintain product quality. In accordance with examples of the present disclosure, however, an evaporator may be operated at a pressure above positive pressure which still maintaining product quality.

FIG. 1 is a block diagram illustrating a generic system 10 that uses a solvent to recover an asphalt component from an asphalt-containing material. System 10 is merely one example of an asphalt recovery system, and systems having other configurations can be used without departing from the scope of the disclosure. System 10 in FIG. 1 includes an extractor 12, a desolventizer 14, and an evaporator 16. In operation, a stream of asphalt-containing material 18 enters extractor 12 and contacts a solvent stream 20. The solvent in solvent stream 20 may solubilize (e.g., dissolve) an asphalt component of asphalt-containing material 18 within extractor 12. In such examples, extractor 12 may generate an asphalt-rich solvent stream 22, which may also be referred to as a miscella stream, and an asphalt-reduced solids stream 24. Asphalt-rich solvent stream 22 may then be processed in evaporator 16 to produce a concentrated asphalt-rich solvent stream 26 and/or asphalt-reduced solids stream 24 may then be processed in desolventizer 14 to produce a dried solids stream 28. In addition, a vapor stream 30 from desolventizer 14 may be processed in evaporator 16 for heat recovery.

For instance, in the example process of FIG. 1, desolventizer 14 is configured to receive asphalt-reduced solids stream 24 and to vaporize solvent in asphalt-reduced solids stream 24 so as to produce dried solids stream 28 and a vapor stream 30 that includes vaporized solvent. In addition, evaporator 16 is configured to receive asphalt-rich solvent stream 22 and to vaporize solvent in asphalt-rich solvent stream 22 so as to produce concentrated asphalt-rich solvent stream 26 and a vapor stream 32 that includes vaporized solvent. In some examples, as illustrated in FIG. 1, vapor stream 30 from desolventizer 14 may be used as a thermal energy source in evaporator 16 to heat asphalt-rich solvent stream 22 and to evaporate solvent from the stream. In other examples, evaporator 16 may use a different type of thermal energy source such as, e.g., steam, and it should be appreciated that the disclosure is not limited to the example source of FIG. 1.

As described in greater detail below, one or more process units of system 10 may be configured to operate at or above an ambient pressure so as to generate concentrated asphalt-rich solvent stream 26 from asphalt-containing material 18. For example, extractor 12 and/or desolventizer 14 and/or evaporator 16 may be configured to operate at or above an ambient pressure during the processing of asphalt-containing material 18 so as to generate concentrated asphalt-rich solvent stream 26. By configuring extractor 12 and/or desolventizer 14 and/or evaporator 16 to operate at or above an ambient pressure, the boiling point of the solvent from solvent stream 20 may be increased as compared to when one or more of the units are operated at a comparatively lower pressure.

Operating pressure within the equipment may be increased for a variety of reasons. Keeping in mind that the aggregate on the shingles is generally very abrasive, solids sealing equipment used in negative pressure systems such as rotary valves and/or slide gates are easily worn out. Further, when this sealing equipment is installed for operation under negative pressures, large amounts of air may be drawn into the solvent laden system. This may create an explosive atmosphere within the equipment.

By contrast, operation under a balanced or slight positive pressure may minimize gas in leakage and lessen the possibility that an explosive atmosphere will be created within the equipment. Techniques for generating a positive pressure include injecting nitrogen into the extractor or desolventizer. While suitable in some applications, this approach can increases the amount of non condensables entering the system, resulting in increased losses at the Vent Condenser & Mineral Oil System. The Mineral Oil System is described in the US EPA Food and Agricultural Industry, Chapter on Vegetable Oil Processing.

When the boiling point of the solvent from solvent stream 20 is increased, e.g., due to an increased operating pressure within system 10, the processing units within system 10 (e.g., extractor 12, desolventizer 14, evaporator 16) may be operated at comparatively higher temperatures. In evaporation equipment, these comparatively higher temperatures may help ensure that streams within system 10 that include asphalt from asphalt-containing material 18 maintain sufficient fluidity (e.g., viscosity) to pass through system 10 without solidifying or otherwise plugging up processing equipment within system 10. Plugging or solidification may be especially problematic with an asphalt-rich stream (e.g., asphalt-rich solvent stream 22) as solvent in the stream is removed and as an asphalt component in the stream is concentrated, as may occur in evaporator 16.

System 10 in the example of FIG. 1 is configured to extract an asphalt component from asphalt-containing material 18 in extractor 12 by contacting the asphalt component with a solvent from solvent stream 20. Asphalt-containing material 18 may be any asphalt-containing material such as, e.g., asphalt paving material, asphalt construction material, asphalt roofing material, or the like. In one example, asphalt-containing material 18 is an asphalt roofing material that includes solidified asphalt integrated with filler material (e.g., fibrous material, aggregate, or granules). Solvent stream 20 includes one or more solvents that are configured to solubilize an asphalt component of asphalt-containing material 18. Example solvents include, but are not limited to, trichloroethylene, acetone, hexane, toluene, 3-(N-maleimidopropioyl)-biocytin, isopropyl alcohol, and combinations thereof.

Asphalt-containing material 18 contacts solvent stream 20 in extractor 12. Asphalt-containing material 18 may be chemically and/or mechanically prepared prior to introduction into extractor 12. For example, asphalt-containing material 18 may be shredded or comminuted using a shredder, hammer mill, or other size reducing device to increase the surface area of the material prior to introduction into extractor 12. In general, decreasing the size of asphalt-containing material 18 may increase asphalt solubilization rates within extractor 12 and/or increase the amount of asphalt liberated (e.g., solubilized) within extractor 12.

Extractor 12 may be configured to contact an asphalt-containing material 18 with solvent from solvent stream 20 so as to extract an asphalt component from the asphalt-containing material. While extractor 12 for shingles has mostly been implemented as a batch extractor, operation under positive pressure may be implemented for continuous extractors as well. For example, extractor 12, desolventizer 14, and evaporator 16 may operate as continuous processing units rather than batch units. A continuous extractor may be operated without the variations in pressure and temperature typically experienced with batch operation. Various examples of continuous extractors (extractor 12) may be a continuous loop extractor, a shallow or deep bed percolation extractor, or an immersion-type extractor. In another example, extractor 12 may be a counter-flow extractor in which asphalt-containing material 18 and solvent from solvent stream 20 are contacted in countercurrent flow. In such an example, extractor 12 may have one or more stages (e.g., two, three, or more stages), where each stage of the extractor increases the concentration of the asphalt component in the solvent stream relative to the prior stage and decreases the amount of asphalt component in the solids stream relative to the prior stage. Non-limiting examples of commercially available extractors that can be used as extractor 12 in system 10 include the Model III Extractor and Model IV Extractor, which are both available from Crown Iron Works.

Because extractors generally run solvent rich, extractor 12 can be operated at any suitable temperature and pressure conditions. In some examples, extractor 12 receives asphalt-containing material 18 and/or a solvent from solvent stream 20 or otherwise operates at a temperature greater than 100 degrees F. such as, e.g., a temperature greater than 150 degrees F., a temperature greater than 170 degrees F., or a temperature between approximately 160 degrees F. and approximately 225 degrees F. In some such examples, extractor 12 may receive asphalt-containing material 18 and/or a solvent from solvent stream 20 or otherwise operate at a temperature below the boiling point of the solvent from solvent stream 20 such as, e.g., a temperature ranging from approximately 0.5 degrees F. to approximately 40 degrees F. below the boiling point of the solvent from solvent stream 20.

In one example, extractor 12 operates at a temperature equal to or greater than the boiling point of the solvent within the extractor. This may cause a portion of the solvent to vaporize within the extractor, generating a positive pressure environment that prevents ambient air from entering the extractor. Preventing ambient air from entering the extractor may help prevent the formation of an explosive atmosphere within the extractor.

Extractor 12 can operate at a variety of pressures ranging from negative pressure to ambient pressure to positive pressure. In some examples, extractor 12 is configured to operate at or above an ambient pressure. For example, extractor 12 may be configured to operate at a positive pressure of at least about ¼ in. $H_2O$ such as, e.g., from about ¼ in. $H_2O$ to about ½ in. $H_2O$ (about 0.02 in. Hg to about 0.04 in. Hg), although other pressures are also possible. While extractor 12 can operate at any suitable pressures, operating extractor 12 at or above a positive pressure may increase the boiling point of the solvent from solvent stream 20 within the extractor.

In some examples, extractor 12 may be configured to receive a solvent stream 20 that is substantially free of asphalt and produce an asphalt-rich solvent stream 22 that exhibits greater than five weight percent asphalt. For example, extractor 12 may be configured to receive a solvent stream 20 that is substantially free of asphalt and produce an asphalt-rich solvent stream 22 that exhibits greater than five weight percent asphalt such as, e.g., greater than ten weight percent asphalt.

System 10 in the example of FIG. 1 also includes desolventizer 14. Desolventizer 14 is configured to receive asphalt-reduced solids stream 24 from extractor 12. Depending on the application, asphalt-reduced solids stream 24 may include solvent-wet solids such as, e.g., solvent-wet filler material remaining from an asphalt roofing material in which an asphalt component has been extracted via extractor 12. In such examples, desolventizer 14 may be configured to dry the solvent-wet solids, e.g., with application of heat, to produce dried solids stream 28 and a vapor stream 30 that includes vaporized solvent. Dried solids stream 28, which may include substantially desolventized solids, may then be collected and/or conveyed from desolventizer 14 for further handling and processing, e.g., screening, disposal, etc.

In general, desolventizer 14 may include any process equipment configured to vaporize solvent from solvent-wet solids with application of thermal energy. In some examples, desolventizer 14 may be implemented using a desolventizer toaster (DT). A desolventizer toaster may include a plurality of trays in a stacked arrangement with the trays heated by steam or some other heat media. The primary mode of heat transfer is indirect where the solids are separated from the heating media by the trays. This method of desolventization is in contrast to more typical desolventizers that use direct contact steam injection, e.g., at the bottom of the trays, for vaporizing the solvent from the solvent-wet solids. Direct steam injection results in a water/solvent combination that may need to be distilled before it can be reused in the plant, increasing the cost of operation. In different examples, the desolventizer toaster may include perforated trays, solid trays (i.e., non-perforated trays), or a combination of solid and perforated trays. Depending on the configuration, the desolventizer toaster may be configured to receive solvent-wet solids so the solvent-wet solids land on pre-desolventizing tray(s) (for example, steam-heated pre-desolventizing tray or hot oil-heated pre-desolventizing tray). The desolventizer toaster may also include a sweep arm to distribute the solvent-wet solids across the tray(s). The sweep arm may be configured to deliver sparge steam at the trailing edge of the sweep arm.

In operation, the solvent-wet solids may flow from one tray in the stacked arrangement to another tray in the stacked arrangement. For example, the desolventizer toaster may include one or more top trays that function as pre-desolventizing trays to flash the vapor solvent from the solids, one or more middle trays to indirectly heat the solvent-wet solids, and one or more bottom trays for final steam stripping. The one or more middle trays may or may not include conduits (e.g., hollow stay bolts) for upwardly venting solvent vapors from one tray to the next. These vapors may travel counter current to the direction of solids travel. Solids levels on each of the one or more middle trays may be controlled by gates and sails, which may controllably convey the solids downwardly through the desolventizer toaster. In some applications, the bottom tray of the desolventizer toaster may include a valve that is operable to control the level of solids in the desolventizer toaster, e.g., at a set level. The bottom tray in the desolventizer toaster may be perforated for direct "sparge" steam injection, which may strip the final solvent from the solids and vent the stripped solvent upwardly. Thus, depending on the configuration, the desolventizer toaster may include steam heated trays and counter-current steam stripping to raise the temperature of the solvent-wet solids and thereby vaporize the solvent from the solids. In this way, the desolventizer toaster may be configured to vaporize solvent from solvent-wet solids to produce dried solids stream 28 and vapor stream 30.

Desolventizer 14 can be operated at any acceptable temperature and pressure conditions. For example, desolventizer 14 can be operated at negative pressure, ambient pressure, or positive pressure. In some examples, desolventizer 14 is configured to receive asphalt-reduced solids stream 24 from extractor 12 and vaporize at least a portion of the solvent from the solids stream with application of steam. Depending on various operating parameters such as, e.g., the operating pressure within desolventizer 14, the desolventizer may produce a vapor stream 30 at a temperature at or above the boiling point of the solvent from solvent stream 20. For example, desolventizer 14 may produce a vapor stream 30 at a temperature ranging from the boiling point of the solvent from solvent stream 20 to fifteen degrees F. above the boiling point of the solvent from solvent stream 20. Such thermal energy may or may not be recovered from vapor stream 30 in one or more downstream processing units.

In the example process of FIG. 1, system 10 includes evaporator 16. Evaporator 16 is configured to receive asphalt-rich solvent stream 22 from extractor 12 and to vaporize solvent in the stream so as to produce a concentrated asphalt-rich solvent stream 26. In some examples, asphalt-rich solvent stream 22 may be filtered between extractor 12 and evaporator 16, e.g., to remove fines or other particulate matter. In such examples, any suitable types of filtration techniques may be used. For example, a settling tank may be implemented upstream of a filtration unit to provide residence time for the settling of the fines before subsequently filtering asphalt-rich solvent stream 22 through the filtration unit.

Evaporator 16 may be configured to receive asphalt-rich solvent stream 22 from extractor 12 and to concentrate an asphalt component in the asphalt-rich solvent stream by vaporizing solvent from the stream. For example, during operation, asphalt-rich solvent stream 22 may be heated within evaporator 16 to a temperature at or above a boiling point of the stream. This may vaporize solvent so as to concentrate the asphalt component in the stream. As asphalt-rich solvent stream 22 passes through evaporator 16, the composition of the stream may change from being comparatively solvent rich (e.g., greater than fifty weight percent solvent) to comparatively asphalt rich (e.g., greater than fifty weight percent asphalt), increasing in viscosity through the evaporator.

In some examples, evaporator 16 may be configured to receive an asphalt-rich solvent stream 22 that exhibits greater than five weight percent asphalt (e.g., from five weight percent to fifteen weight percent asphalt) and to produce a concentrated asphalt-rich solvent stream 26 that exhibits greater than thirty weight percent asphalt such as, e.g., greater than fifty weight percent asphalt. For example, evaporator 16 may be configured to produce a concentrated asphalt-rich solvent stream 26 that exhibits from thirty weight percent asphalt to approximately ninety-nine weight percent asphalt such as, e.g., from approximately eighty-five weight percent asphalt to approximately ninety-five weight percent asphalt.

Evaporator 16 may be implemented using any suitable processes equipment or combination of processes equipment. More typical examples include rising or falling film evaporators, which are most cost effective. However, in some examples, evaporator 16 may be an agitated-film evaporator, a wiped or thin film evaporator, or the like. Additionally or alternatively, evaporator 16 may include a heat exchanger such as, e.g., a shell and tube heat exchanger or a plate and frame heat exchanger, to transfer thermal energy between one or more thermal energy sources and asphalt-rich solvent stream 22.

In the example of FIG. 1, evaporator 16 is illustrated as a single evaporator unit in which vapor stream 30 from desolventizer 14 is used to heat asphalt-rich solvent stream 22 to concentrate an asphalt component in the asphalt-rich solvent stream. Such an example heat transfer arrangement may be useful to efficiently recover heat from desolventizer 14 for downstream operations. In other examples, however, evaporator 16 may use a different type of thermal energy source such as, e.g., steam, and it should be appreciated that the disclosure is not limited to the example heat transfer configuration of FIG. 1.

Figure 2:
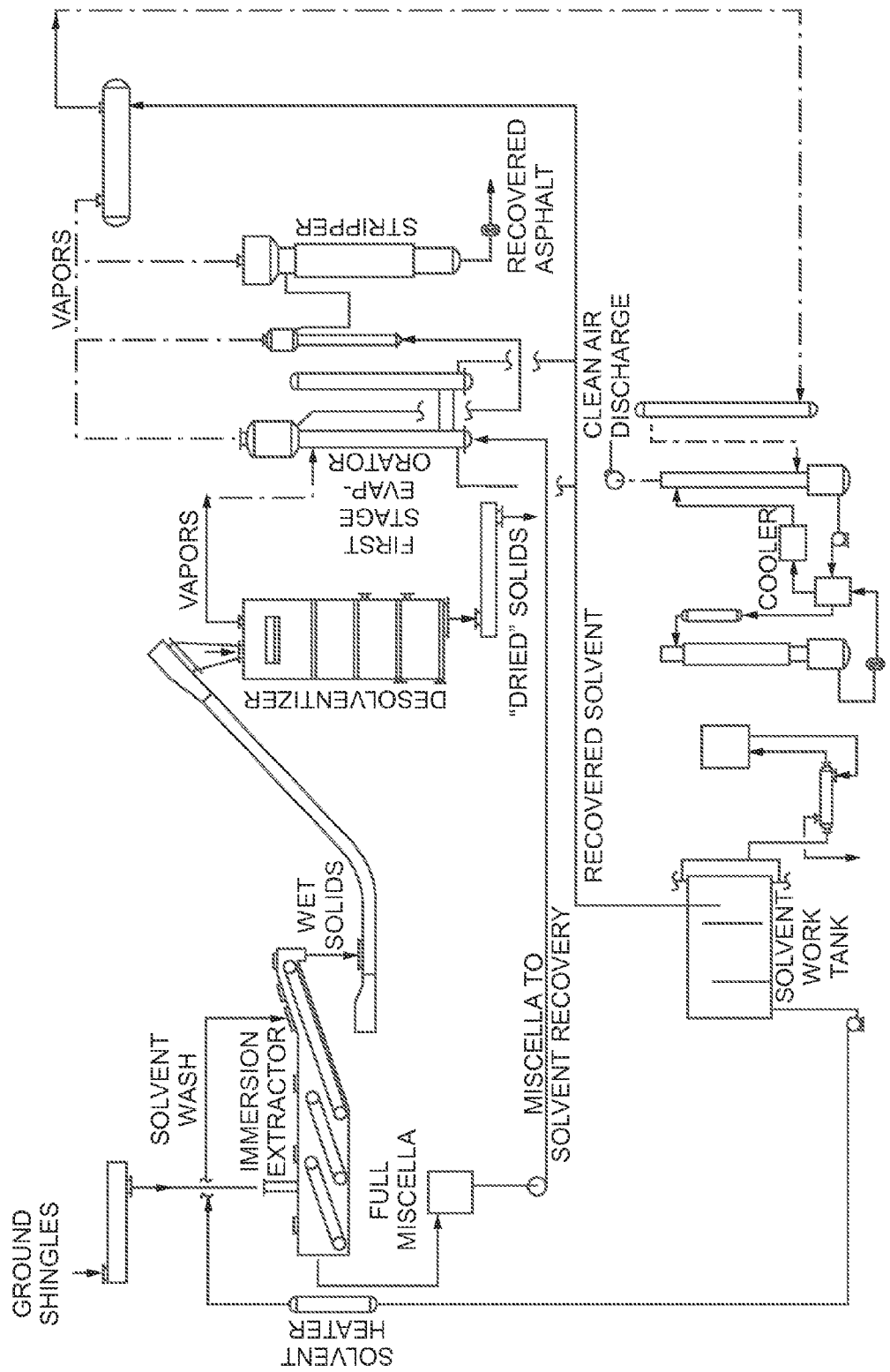
FIG. 2 is a flow diagram illustrating another example process for recovering an asphalt component from an asphalt-containing material.

Further, in still other examples, evaporator 16 may include two or more evaporator units (e.g., arranged in series) rather than a single evaporator unit. FIG. 2 illustrates an example of such a process configuration. As seen in this example, evaporator 16 includes a first evaporator unit and a second evaporator unit. The first evaporator unit may receive vapor stream 30 from desolventizer 14 to heat asphalt-rich solvent stream 22 and to concentrate an asphalt component in the asphalt-rich solvent stream. When so arranged, desolventizer 14 may operate at a positive pressure relative to ambient pressure and/or the first evaporator may be operated at a negative pressure relative to ambient. The first evaporator unit produces an intermediate concentrated asphalt-rich solvent stream that is then conveyed to a second evaporator unit. The second evaporator unit may receive thermal energy from another source (e.g., steam) to further concentrate the asphalt component in the intermediate concentrated asphalt-rich solvent stream. In some examples, the first evaporator is a rising or falling film evaporator generally followed by a second rising film evaporator. Wiped film evaporators can be used as the second stage evaporator, but they are generally expensive, requiring a great deal of maintenance and operator attention.

Evaporator 16 can be operated at any suitable temperature and pressure conditions. In some examples, evaporator 16 receives from the extractor a solvent-rich asphalt stream at temperatures generally higher than 122 degrees F. such as, e.g., a temperature greater than approximately 160 degrees F., a temperature ranging from approximately 145 degrees F. to approximately 200 degrees F., or a temperature ranging from approximately 165 degrees F. to approximately 175 degrees F. and heats the asphalt-rich stream to a temperature greater than 200 degrees F. such as, e.g., a temperature greater than 220 degrees F., or a temperature ranging from approximately 200 degrees F. to approximately 240 degrees F. Operating evaporator 16 at a comparatively higher temperature may reduce or eliminate asphalt plugging within the evaporator during operation. For example, operating evaporator 16 at temperatures greater than 250 degrees F. may help prevent an asphalt component in asphalt-rich solvent stream 22 from plugging the evaporator, e.g., as the asphalt component is concentrated through evaporator 16.

Evaporator 16 can operate at any acceptable pressure. In different examples, evaporator 16 may be configured to operate at negative pressure, ambient pressure, and/or positive pressure. In some examples, at least one evaporator unit of evaporator 16 (e.g., in instances in which evaporator 16 includes multiple units) is configured to operate at a positive pressure relative to ambient pressure. For example, at least one evaporator unit of evaporator 16 (and in some cases all evaporator units of evaporator 16) may be configured to operate at a positive pressure of at least 10 inches of $H_2O$ such as, e.g., at least 14 in. $H_2O$, from about 14 in. $H_2O$ to about 30 in. $H_2O$ (about 0.74 in. Hg to about 2.21 in. Hg), or from about 14 in. $H_2O$ to about 150 in. $H_2O$, although other pressures are also possible. Operating evaporator 16 at a higher pressure may enable the evaporator to operate at a higher temperature, e.g., because the boiling point of the solvent in asphalt-rich solvent stream 22 may increase as the pressure in evaporator 16 increases. Evaporator pressure may be measured at a liquid outlet of the evaporator (e.g., an outlet were asphalt separated from solvent is recovered).

In some examples, evaporator 16 is operated at a positive pressure sufficient to increase a boiling point of the solvent within the evaporator (e.g., as compared to operating at a pressure below atmospheric pressure) such that a viscosity of asphalt within the evaporator is less than 500 centipoise (e.g., less than 300 centipoise or less than 200 centipoise). This may help ensure that the viscosity of asphalt within the evaporation is sufficiently low so that the asphalt does not plug the evaporator.

In some examples, evaporator 16 may be configured to operate at a pressure such that the boiling point of asphalt-rich solvent stream 22 is greater than 250 degrees F. In addition, the pressure of evaporator 16 may be controlled (e.g., increased and/or decreased) to control the boiling point of the solvent in evaporator and, hence, operating temperature of the evaporator. In general, operating evaporator 16 at a comparatively higher temperature and pressure may reduce or eliminate asphalt plugging within the evaporator as compared to when the evaporator is operated at a lower pressure and operating temperature.

Evaporator 16 may generate a concentrated asphalt-rich solvent stream 26 and a vapor stream 32 that includes vaporized solvent. Vapor stream 32 may be condensed and conveyed, e.g., for further processing and recovery. Concentrated asphalt-rich solvent stream 26 may be cooled and/or otherwise processed to recover the asphalt component from the concentrated asphalt-rich solvent stream.

Figure 3:
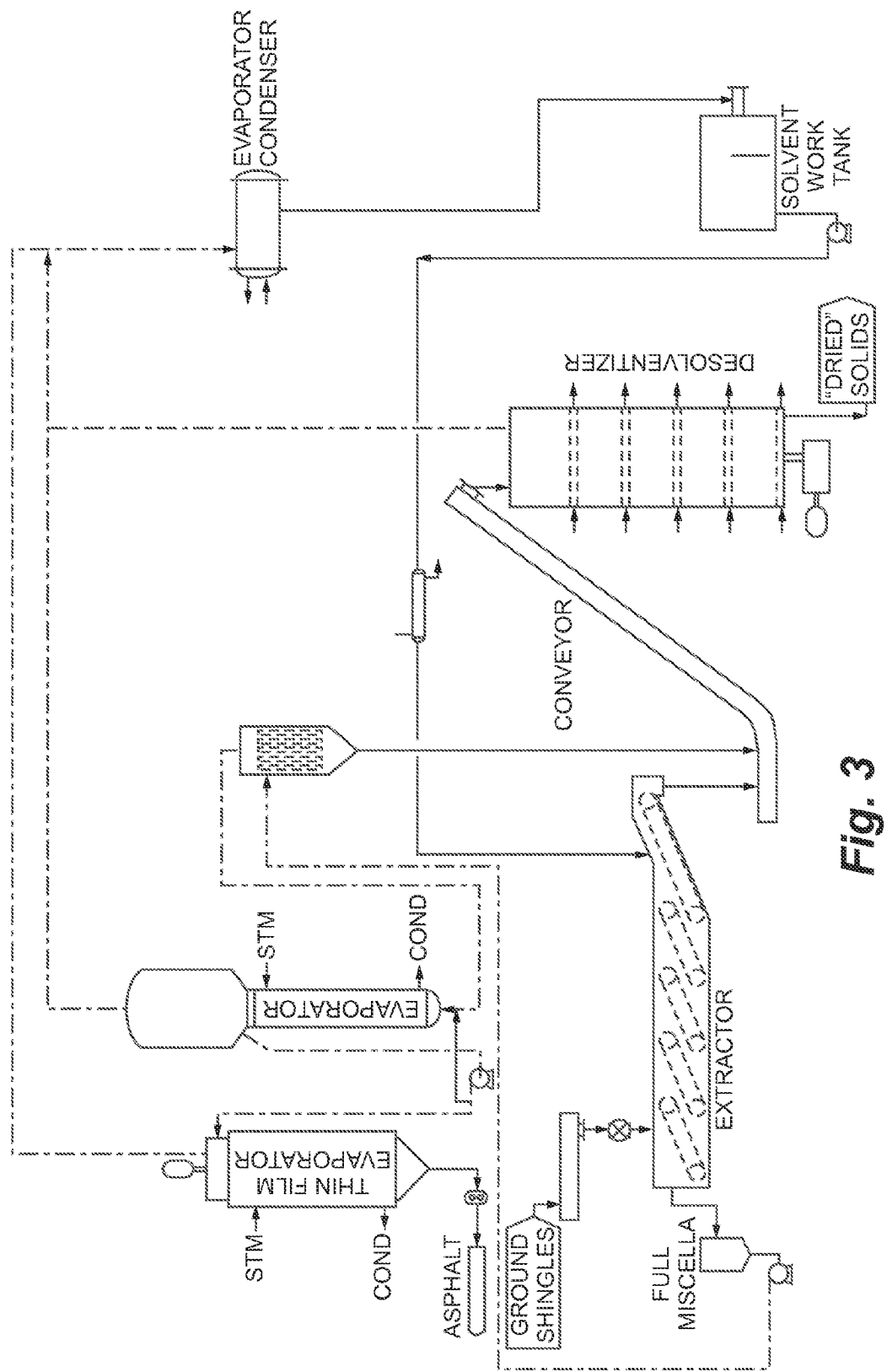
FIG. 3 is a flow diagram illustrating another example process for recovering an asphalt component from an asphalt-containing material.

While system 10 has been described as including extractor 12, desolventizer 14, and/or evaporator 16, it should be appreciated that a system in accordance with the disclosure may include additional or alternative operating units, and the disclosure is not limited to the example configuration of FIG. 1. Example operating units that may be employed in conjunction with extractor 12, desolventizer 14, and/or evaporator 16 are illustrated in FIG. 3.

The following examples may provide additional details about asphalt recovery systems and techniques in accordance with this disclosure.

EXAMPLES

Samples of an asphalt-rich solvent stream from an asphalt recovery process in accordance with the disclosure were taken and analyzed in using a Brookfield viscometer. The tests were conducted to determine the viscosity behavior of the samples as a function of both solvent content in stream and the temperature of the stream. Viscosity data from the samples are provided in the table below.

| Weight Percentage of the Sample that is Solvent | Temperature (F.) | Viscosity (centipoise) |
|---|---|---|
| 63.38 | 64 | 32 |
| 49.18 | 64 | 96 |
| 37.72 | 64 | 360 |
| 30.91 | 64 | 2424 |
| 27.63 | 64 | 11840 |
| 24.16 | 64 | 28640 |
| 22.77 | 64 | 45280 |
| 20.50 | 64 | 127000 |
| 61.09 | 198 | 8 |
| 46.58 | 202 | 29 |
| 36.11 | 202 | 58 |
| 28.62 | 196 | 109 |
| 23.73 | 198 | 144 |
| 22.36 | 204 | 163 |
| 22.29 | 201 | 166 |
| 21.36 | 196 | 195 |
| 12.68 | 201 | 1616 |
| 6.95 | 200 | 61100 |
| 46.58 | 225 | 26 |
| 31.64 | 226 | 54 |
| 29.73 | 225 | 74 |
| 24.45 | 222 | 112 |
| 19.89 | 222 | 157 |
| 17.10 | 222 | 234 |
| 11.66 | 225 | 808 |
| 6.47 | 226 | 27500 |
| 38.84 | 250 | 32 |

-continued

| Weight Percentage of the Sample that is Solvent | Temperature (F.) | Viscosity (centipoise) |
|---|---|---|
| 33.53 | 252 | 45 |
| 28.78 | 248 | 70 |
| 25.96 | 248 | 83 |
| 20.09 | 250 | 109 |
| 19.57 | 252 | 118 |
| 10.61 | 248 | 560 |
| 8.33 | 250 | 1152 |
| 0 | 252 | 34200 |
| 0 | 258 | 20200 |
| 0 | 280 | 10600 |
| 0 | 346 | 3800 |

Figure 4:
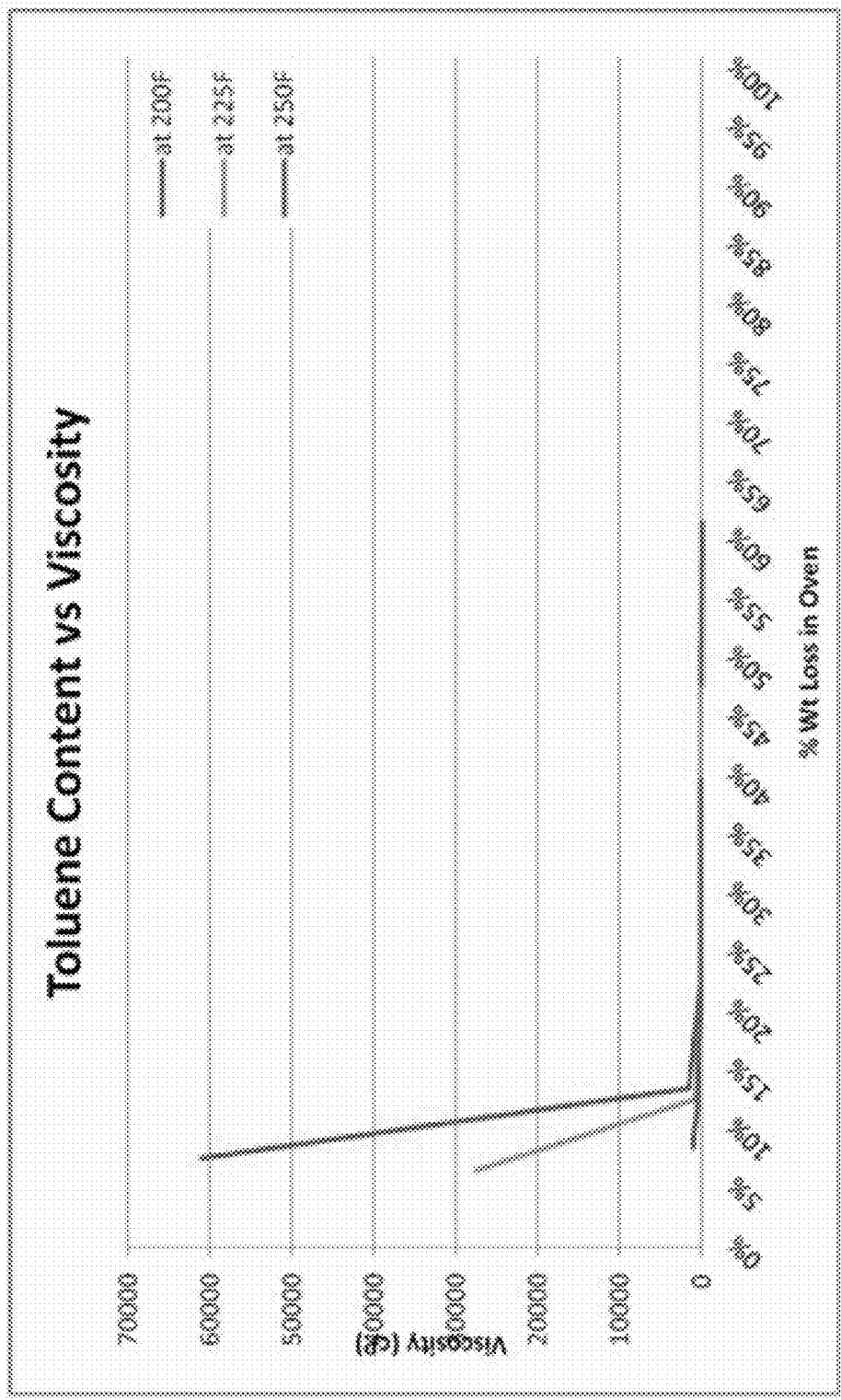
FIGS. 4 and 5 are plots of viscosity versus stream solvent content values for example asphalt-rich solvent stream samples.
Figure 5:
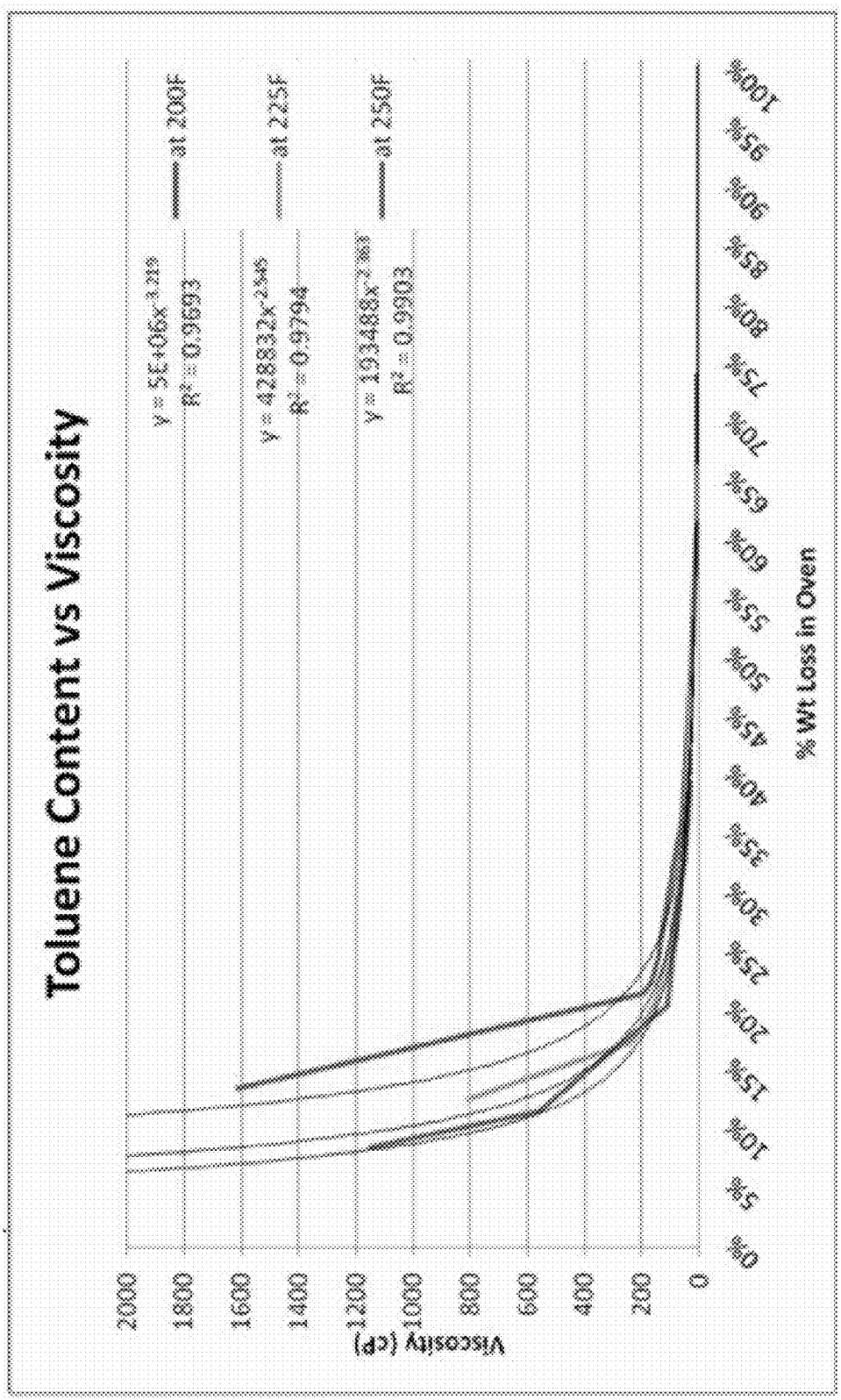

FIGS. 4 and 5 are plots of viscosity versus stream solvent content for the tested samples. The y-axis in the plots is viscosity in centipoise (cp). The x-axis in the plots is weight percentage solvent in each sample at a given viscosity. The data show that at a given solvent content, viscosity is lower at comparatively higher temperatures.

Figure 6:
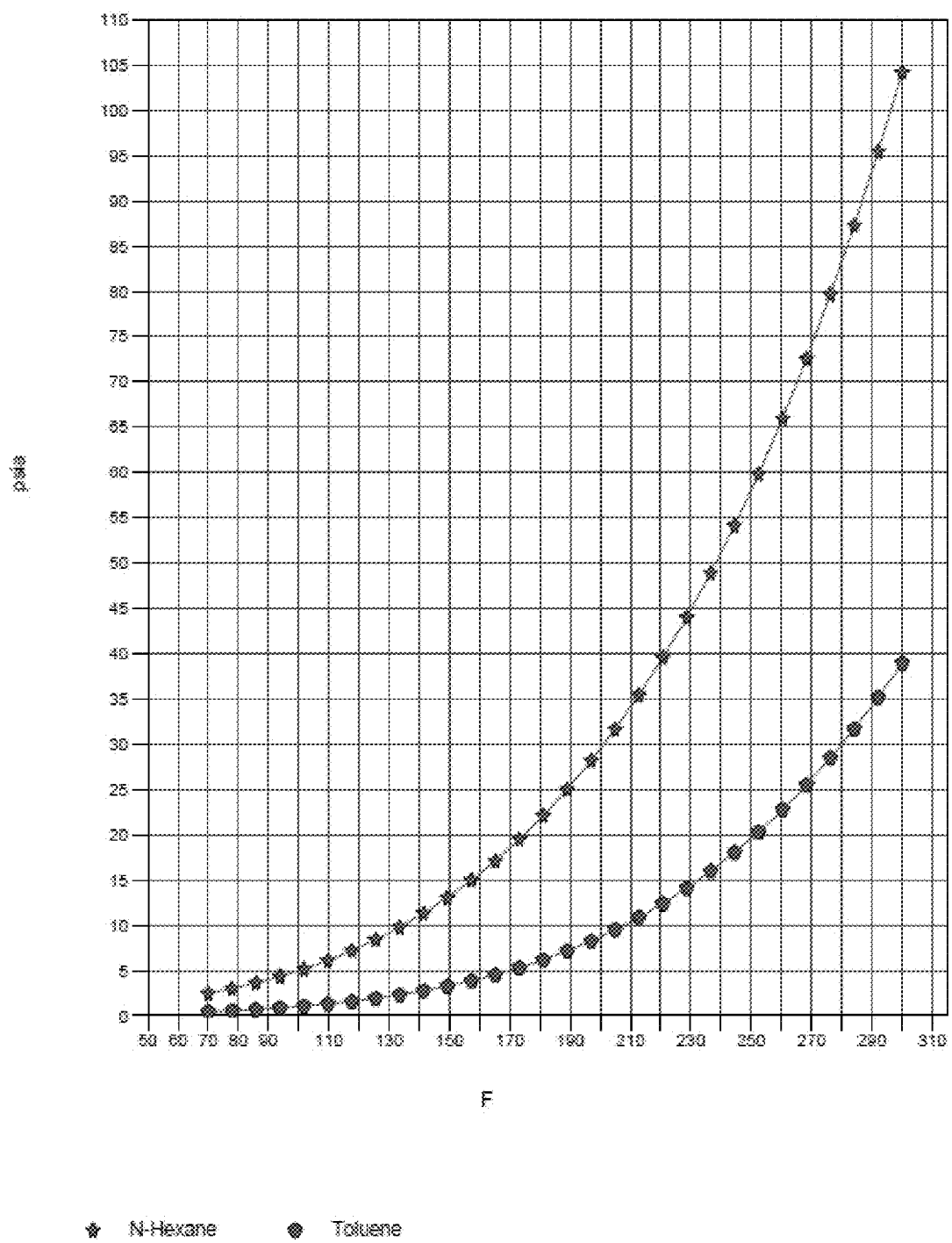
FIG. 6 is a plot of vapor pressure for example solvents that may be used in a solvent recovery system.

FIG. 6 is a plot of vapor pressure for example solvents—toluene and n-hexane—that may be used in a solvent recovery system. FIG. 6 illustrates how solvent temperature increases with increasing pressure.

Various modifications and additions may be made to the exemplary embodiments described hereinabove without departing from the scope, intent and spirit of the instant invention. For example, while the disclosed embodiments refer to particular features, the scope of the instant invention is considered to also include embodiments having various combinations of features different from and/or in addition to those described hereinabove. Accordingly, the present invention embraces all such alternatives, modifications, and variations as within the scope, intent and spirit of the appended claims, including all equivalents thereof.

The invention claimed is:

1. An asphalt recovery process comprising:
    extracting asphalt from roofing waste with a solvent in an extractor to form an asphalt-rich solvent stream and solvent-wet solids stream;
    processing the solvent-wet solids in a desolventizer at a pressure below atmospheric pressure to vaporize solvent from the solvent-wet solids stream and yield desolventized solids; and
    vaporizing solvent from the asphalt-rich solvent stream in an evaporator, wherein the evaporator is operated at a pressure above atmospheric pressure so as to increase a boiling point of the solvent as compared to operating at a pressure below atmospheric pressure and so that a viscosity of asphalt within the evaporator is less than 500 centipoise.

2. The process of claim 1, wherein vaporizing solvent from the asphalt-rich solvent stream in the evaporator comprises operating the evaporator at a temperature greater than 250 degrees Fahrenheit.

3. The process of claim 1, wherein the pressure above atmospheric pressure is a pressure of at least 10 inches of $H_2O$, as measured at a liquid outlet of the evaporator, and the viscosity of asphalt within the evaporator is less than 200 centipoise.

4. The process of claim 3, wherein the pressure above atmospheric pressure is a pressure, as measured at a liquid outlet of the evaporator, ranging from approximately 14 inches of $H_2O$ to a pressure of approximately 150 inches of $H_2O$.

5. The process of claim 1, wherein solvent comprises at least one of toluene and hexane.

6. The process of claim 5, wherein vaporizing solvent from the asphalt-rich solvent stream in the evaporator comprises operating the evaporator at a temperature greater than or equal to a boiling point of the solvent.

7. The process of claim 1, wherein extracting asphalt from roofing waste with the solvent in the extractor comprises operating the extractor at a pressure above atmospheric pressure so as to prevent formation of an explosive atmosphere within the extractor.

8. The process of claim 7, wherein the extracting asphalt from roofing waste with the solvent in the extractor comprises operating the extractor at a temperature greater than or equal to a boiling point of the solvent so as to create the pressure above atmospheric pressure in the extractor.

9. The process of claim 1, wherein the evaporator comprises at least one of a rising film evaporator and a falling film evaporator.

* * * * *